March 30, 1965 R. B. JONES ETAL 3,176,284
SYSTEM RESPONSIVE TO PLURAL CONDITIONS WITH
FALSE INDICATION PREVENTION
Filed Sept. 27, 1963 2 Sheets-Sheet 1

INVENTORS
ROGER B. JONES
RAYMOND BRUCE SMITH
BY
AGENT

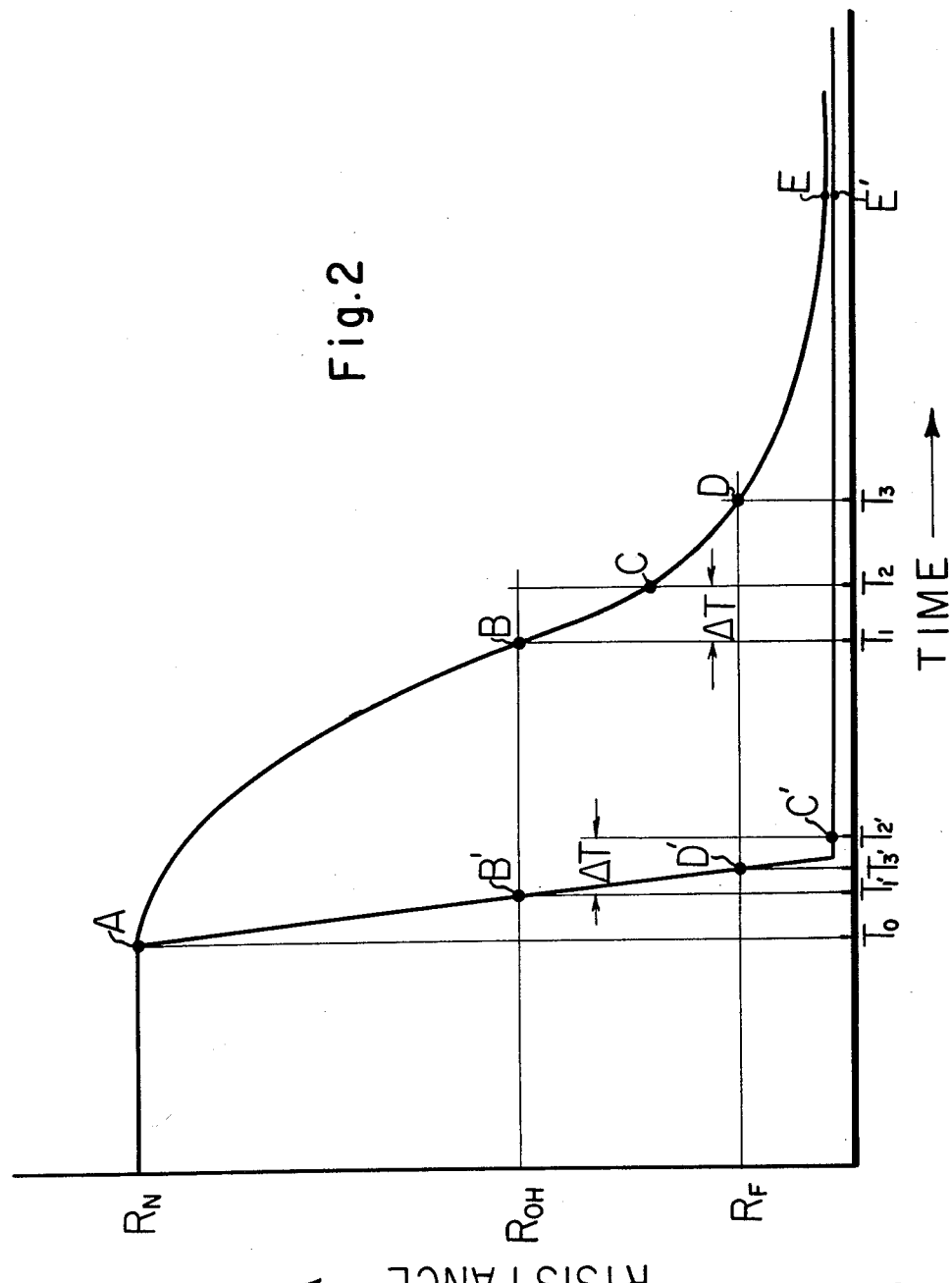

United States Patent Office 3,176,284
Patented Mar. 30, 1965

3,176,284
SYSTEM RESPONSIVE TO PLURAL CONDITIONS
WITH FALSE INDICATION PREVENTION
Roger B. Jones, North Caldwell, and Raymond Bruce
Smith, Wayne, N.J., assignors to Specialties Development Corporation, Belleville, N.J., a corporation of
New Jersey
Filed Sept. 27, 1963, Ser. No. 312,107
4 Claims. (Cl. 340—213)

The present invention relates to condition responsive systems, and, more particularly, to such systems which are prevented from giving a false indication in response to a circuit fault.

Electrical systems for indicating when a condition under observation (such as temperature, smoke density, humidity, salinity, pressure, radiation intensity or the like) has achieved a predetermined magnitude, utilize a transducer to translate the presence of the condition into an electrical signal having a value which is dependent upon the magnitude of the condition. This signal is monitored by suitable circuitry, and, when it achieves a value indicating that the condition has reached the predetermined magnitude, an alarm or other indicating device is actuated in response to the signal.

In many of these systems, the signal normally produced by the transducer when the condition is at the predetermined magnitude, can be duplicated at other times by the occurrence of a particular circuit fault, for example, a short circuit or an open circuit within the transducer, and therefore a false indication will be given whenever that particular circuit fault occurs.

Examples of such systems are heat and fire detecting systems of the type which comprises an elongated fire detecting element including two conductors within a metallic sheath and spaced apart by a thermistor material having a negative temperature coefficient of resistivity, and indicating circuitry for monitoring the resistance of the thermistor material and giving an indication when the resistance of the material indicates the presence of a fire or an overheat condition.

In this type of system, an indication is given whenever the resistance of the detecting element falls below a predetermined value. Thus, when a fault develops within the detecting element or associated circuitry which short circuits the thermistor material, the apparent resistance of the detecting element decreases sharply and a false indication is given.

Systems of this type are commonly used to protect aircraft, and such systems are subjected to constant vibration, particularly detecting elements thereof which are positioned within the engine housing. This constant vibration is capable of physically damaging or displacing a system component in a manner so that the detecting element becomes short circuited.

Although such short circuits are not too frequent, they occur more often than fires. Therefore, when the system gives a fire indication, there is a natural tendency on the part of the aircraft crew to disregard the warning on the premise that the indication is probably the result of a malfunction of the system, unless signs of a fire actually are seen by the crew. This lack of faith in the accuracy of the fire warnings greatly reduces the effectiveness of the system because the initiation of emergency measures to put out the fire may be delayed until the fire reaches such a magnitude that it cannot be controlled and extinguished.

In co-pending United States patent application Serial No. 164,077, filed January 3, 1962, there is disclosed a fire detecting system of the type discussed above which discriminates between a decrease in element resistance resulting from a fire and one resulting from a short circuit. In that system, an alarm is given when the element resistance drops below a predetermined value as a result of a fire being present, but no alarm is given if the element is short circuited.

While this system is extremely effective in preventing false alarms, it is capable of indicating the existence of only one condition, that is, a temperature generated by the presence of a fire.

In many applications, a fire detecting system is desired which not only gives an indication when a fire is present but also gives an independent indication when an overheat condition exists.

Accordingly, an object of the present invention is to provide a more versatile and reliable condition responsive system.

Another object is to provide such a system which is capable of monitoring at least two different conditions and is capable of discriminating between signals resulting from the sensing of the conditions and signals resulting from a circuit fault.

Another object is to provide such a system which is not subject to false indications due to circuit faults.

A further object is to provide such a system in a simple, practical, and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing in a condition responsive system, condition responsive means having an electrical property which varies in response to variations in a condition from a normal value when the condition is normal toward an extreme abnormal value when the condition becomes abnormal, a first circuit having an input connected to the condition responsive means and having an output for producing an output signal a predetermined time interval after the electrical property moves through a first predetermined value in changing from the normal value toward the extreme abnormal value, switch operating means connected to the circuit output to be actuated when the circuit produces the output signal, indication producing switch means under the control of the switch operating means, a second circuit having an input connected to the condition responsive means and having an output for producing an output signal when the electrical property assumes a second predetermined value which value is more extreme in the abnormal direction than the first predetermined value, second switch operating means, transfer switch means normally connecting the output of the second circuit to the first circuit to inert the first circuit when the electrical property changes in value from the first predetermined value to the second predetermined value in less than the predetermined time interval, the transfer switch being operated by the first switch operating means to connect the output of the second circuit to the second switch operating means to actuate the second switch operating means when the electrical property changes in value from the first predetermined value to the second predetermined value in greater than the predetermined time interval, and second indication producing switch means under the control of the second switch operating means to be operated upon actuation of the second switch operating means.

A preferred embodiment of the invention has been chosen for purposes of illustration and description, and is shown in the accompanying drawings, forming a part of the specification, wherein:

FIG. 2 is a graph illustrating the resistance of the sensing element with reference to time under various conditions.

Figure 1:
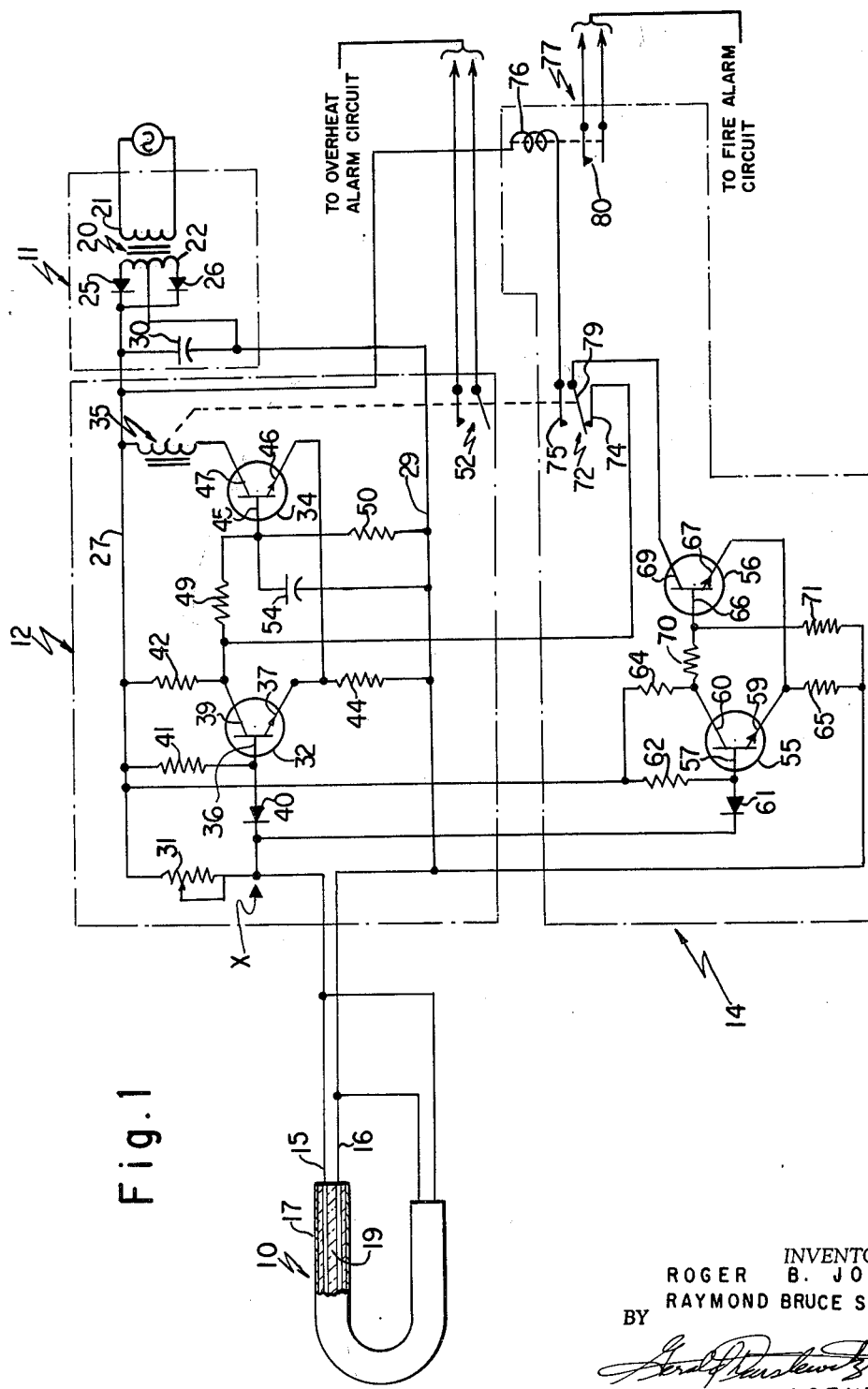
FIG. 1 is a circuit diagram of a system in accordance with the present invention.

Referring now to FIG. 1 of the drawings in detail, there is shown, by way of example, a system according to the present invention which generally comprises a temperature responsive sensing element 10, a source of direct current power 11, a resistance monitoring network 12 for giving an overheat alarm a predetermined time interval after the resistance of the element 10 drops below a predetermined value, and a second resistance monitoring network 14 for both giving a fire alarm when the resistance of the element 10 drops below a second predetermined value subsequent to the operation of the network 12 and for inerting the network 12 to prevent any alarm from being given when the decrease in resistance is due to a short circuit.

The sensing element 10 includes a pair of parallel conductors 15 and 16 positioned within a tubular metallic sheath 17 and spaced from each other and from the sides of the sheath by a mass of thermistor material 19.

The direct current source 11 is a full wave rectifier for receiving alternating current power through a step-down transformer 20 having a primary winding 21 and a secondary winding 22 provided with a center tap 24. The ends of the secondary winding 22 are connected through rectifying diodes 25 and 26 of like polarity to a conductor 27, and the center tap 24 is connected to a conductor 29. A 22 micro-farad capacitor 30 is connected between the conductors 27 and 29 to smooth the output of the diodes. The primary winding 21 is connected to a source of alternating current power of 115 volts at 400 cycles per second to produce 19 volts D.C. between the positive conductor 27 and the negative conductor 29, for example.

The resistance monitoring network 12 includes an adjustable resistor 31 connected in series with the element 10 between the conductors 27 and 29, an NPN type transistor 32 responsive to a predetermined division of voltage between the element 10 and the resistor 31, a second NPN type transistor 34 controlled by the output of the transistor 32, and a relay 35 controlled by the output of transistor 32 for actuating an alarm. The resistor 31 is adjustable between 3,000 and 500,000 ohms for presetting the operating point of the network 12.

The transistor 32 has a base electrode 36, an emitter electrode 37, and a collector electrode 39. The base 36 is connected to a point X at the junction of the sensing element 10 and to the resistor 31 through a diode 40, and is also connected to the conductor 27 through an 82,000 ohm resistor 41. The collector 39 is connected to the conductor 27 through a 2,700 ohm resistor 42, and the emitter 37 is connected to the conductor 29 through a 47 ohm resistor 44.

The transistor 34 has a base electrode 45, an emitter electrode 46, and a collector electrode 47. The base 45 is connected to the collector 39 of the transistor 32 through a 27,000 ohm resistor 49 and is also connected to the conductor 29 through a 4,700 ohm resistor 50. The collector 47 is connected to the conductor 27 through the coil 51 of the relay 35, and the emitter 46 is directly connected to the emitter 37 of the transistor 32. The relay 35 includes a pair of contacts 52 under the control of the coil 51 connected to an overheat alarm circuit (not shown) for giving an indication when the relay is energized.

A 3.3 micro-farad capacitor 54 is connected between the base 45 of the transistor 34 and the conductor 29 to delay the effect of a change in the output of the transistor 32 upon the transistor 34.

The second resistance monitoring network 14 includes a NPN type transistor 55 responsive to a second predetermined division of voltage between the sensing element 10 and the resistor 31, and a NPN type transistor 56 controlled by the output of the transistor 55.

The transistor 55 has a base electrode 57, an emitter electrode 59, and a collector electrode 60. The base 57 is connected to the point X through a diode 61 and is also connected through a 82,000 ohm resistor 62 to the conductor 27. The collector 60 is connected to the conductor 27 through a 2,700 ohm resistor 64, and the emitter 59 is connected to the conductor 29 through a 27 ohm resistor 65.

The transistor 56 has a base electrode 66, an emitter electrode 67, and a collector electrode 69. The base 66 is connected to the collector 60 of the transistor 55 through a 27,000 ohm resistor 70 and is also connected to the conductor 29 through a 4,700 ohm resistor 71. The emitter 67 is connected directly to the emitter 59 of the transistor 55, and the collector 69 is connected to a transfer switch 72 which is part of the relay 35 and is under the control of the relay coil 51. The switch 72 includes a stationary contact 74 connected to the collector 39 of the transistor 32 (in the network 12), a stationary contact 75 connected to the conductor 27 through the coil 76 of an alarm relay 77, and a movable contact 79 connected to the collector 69. The movable contact 79 is in engagement with the contact 74 to connect the collector 69 to the collector 39 when the relay 35 is de-energized, and moves into engagement with the contact 75 to connect the collector 69 to the coil 76 when the relay 35 is energized. The relay 77 includes a pair of contacts 80 under the control of the coil 76 connected to a fire alarm circuit (not shown) for giving an indication when the relay 77 is energized.

In operation, when the sensing element 10 is subjected to normal temperatures its resistance is very high (60,000 to 500,000 ohms) as illustrated by the value $R_N$ on the curves shown in FIG. 2. Under this condition, substantially all of the source voltage is dropped across the sensing element 10, and the point X has a very high positive potential. Since the base 36 is connected to the positive conductor 27 and the emitter 37 is connected to the negative conductor 29, current flows from the conductor 27 through the resistor 41, the base-emitter circuit of the transistor, and the resistor 44 to the conductor 29. The point X is now more positive than the base 36, therefore, all of the current flowing through the resistor 41 flows through the base-emitter circuit of the transistor 32. This flow places the transistor 32 in full conduction allowing current to flow from the conductor 27 through the resistor 42, the collector-emitter circuit of the transistor, and the resistance 44 to the conductor 29. When the transistor 32 is in full conduction, the collector 39 is placed in a low positive potential which causes the base 45 of the transistor 34 to be less positive than the emitter 46 and the transistor is held in the non-conducting condition. The relay coil 51 is not energized, and the contacts 52 and 72 are in the position shown in FIG. 1.

Under the foregoing described condition, the network 14 is in a similar condition with the transistor 55 in full conduction and the transistor 56 is in the non-conducting condition.

Generally, when the sensing element 10 decreases in resistance to a first predetermined value in response to heat, the network 12 operates to produce an overheat alarm, and when the resistance of the sensing element 10 decreases further in response to heat to a second predetermined value, the network 14 operates to energize the fire alarm. However, when the sensing element 10 decreases in resistance due to a short circuit, the network 14 operates to inert the network 12 and to prevent either of the alarms being given.

As shown in FIG. 2, if the sensing element 10 is exposed to a fire at time $T_0$, represented by the point A on the curves, the resistance of the element decreases with time in a manner such as that shown by the curve ABCDE. If, on the other hand, the element becomes short circuited at the time $T_0$, the decrease in the element resistance is substantially instantaneous as shown by the curve AB'D'C'E'. To clarify this explanation, the time interval required for the decrease in resistance due to a short circuit is exaggerated in the curve AB'D'C'E'.

Considering first the operation of the system in response to an overheat or fire condition, the potential of the point X decreases as the resistance of the sensing element 10 decreases along the curve ABCDE. When the point X becomes less positive than the base 36, a portion of the current flowing through the resistor 41 is shunted through the diode 40 and the base current of the transistor 32 decreases. At some predetermined resistance of the sensing element, indicated in FIG. 2 as $R_{OH}$ and represented by the point B on the curve, sufficient current is diverted from the base circuit to reduce the collector current to a point where the base 45 of the transistor 34 is more positive than the emitter 46. The capacitor 54 charges to this new potential of the base 45 and, in so doing, diverts sufficient current from the base-emitter circuit of the transistor 34 to prevent it from becoming conductive for a period of time designated as $\Delta T$. When the capacitor 54 has charged, the transistor 34 begins to conduct and the resulting increase in potential of the emitter 46 is fed back to the emitter 37 thereby driving the transistor 32 to cut off and placing the transistor 34 in full conduction. The coil 51 of the relay 35 is then energized closing the contacts 52 to give an overheat alarm and closing the contacts 79 and 75 to connect the coil 76 into the collector circuit of the transistor 56 in the monitoring network 14. The operation of the relay 35 occurs at the time $T_2$ which is represented by the point C on the curve.

If the resistance of the sensing element continues to decrease, due to the presence of a fire, to the second and lower predetermined value, indicated by the value $R_F$ and represented by point D on the curve, sufficient current is diverted from the base circuit of the transistor 55 to decrease the collector current thereof to a point where a base current begins to flow in the transistor 56. The feedback connection between the emitter 67 and the emitter 59 drives the transistor 55 to cut off and increase the base emitter current of the transistor 56 to place the transistor in full conduction and energize the relay coil 76, thus closing the contacts 80 to give a fire alarm. The transistor 55 responds to a lower element resistance than does the transistor 32 because the emitter resistor 65 is lower in value than the emitter resistor 44 so that the base-emitter current of the transistor 55 is greater than that of the transistor 32 at any particular resistance value of the sensing element 10.

Considering now the operation of the system in response to the short circuiting of the element, when the sensing element resistance decreases to the value $R_{OH}$, represented by the point B' on the curve, the network 12 responds as previously described. However, before the time delay $\Delta T$ (due to the charging of the capacitor 54) has expired the sensing element resistance falls to the value $R_F$, point D' on the curve, and the network 14 is activated. The transistor 56 is then placed in full conduction and the collector current thereof flowing through the resistor 42 returns the potential at the collector 39 to the low value present when the transistor 32 is fully conductive. The transistor 34 is therefore prevented from going into conduction and a false alarm is prevented. When the short circuit is removed, the networks 12 and 14 return to their original condition and are ready to respond to any new decrease in the resistance of the sensing element 10.

The resistance values $R_{OH}$ and $R_F$ of the sensing element 10, at which the networks 12 and 14 operate, are dependent upon the setting of the resistor 31 and may be shifted up or down so that the network 12 will respond to a pre-determined temperature condition.

While the capacitor 54 is provided herein to delay the operation of the relay 35 for the time period $\Delta T$, this delay could be achieved by other means. For example, the relay 35 could be a slow acting relay which requires the time period $\Delta T$ for its operation.

Although the system described herein utilizes a transducer which responds to the condition to be detected by producing a signal capable of being simulated by a short circuit, the present invention is not limited to such systems. It will be readily apparent that the present invention is also useful in systems including a transducer which responds to the condition to be detected by producing a signal capable of being simulated by an open circuit, as for example, a system incorporating a transducer which progressively increases in resistance over a finite period of time in response to the occurrence of the condition to be detected.

From the foregoing description, it will be seen that the present invention provides a simple, inexpensive, and dependable condition responsive system which discriminates between signals resulting from the sensing of a condition and signals resulting from a circuit fault, and which is not subject to false indications as a result of circuit faults.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In a condition responsive system, the combination of condition responsive means having an electrical property which varies in response to variations in condition from a normal value when the condition is normal toward an extreme abnormal value when the condition becomes abnormal, a first switching circuit having an input connected to said condition responsive means and having an output for producing an output signal a predetermined time interval after said electrical property moves through a first predetermined value in changing from said normal value toward said extreme abnormal value, switch operating means connected to said switching circuit output to be actuated when said switching circuit produces said output signal, indication producing switch means under the control of said switch operating means, a second switching circuit having an input connected to said condition responsive means and having an output for producing an output signal when said electrical property assumes a second predetermined value which value is more extreme in the abnormal direction than said first predetermined value, second switch operating means, transfer switch means normally connecting said output of said second switching circuit to said first switching circuit to inert said first switching circuit when said electrical property changes in value from said first predetermined value to said second predetermined value in less than said predetermined time interval, said transfer switch being operated by said first switch operating means to connect said output of said second switching circuit to said second switch operating means to actuate said second switch operating means when said electrical property changes in value from said first predetermined value to said second predetermined value in greater than said predetermined time interval, and second indication producing switch means under the control of said second switch operating means to be operated upon actuation of said second switch operating means.

2. Apparatus according to claim 1, wherein said first switching circuit includes a first switching device having an input connected to said condition responsive means and having an output for producing an output signal of a first signal value when said electrical property is less extreme than said first predetermined value and for producing an output signal of a second signal value when said electrical property is more extreme than said first predetermined value, and a second switching device responsive to said second signal value output signal of said first switching device for actuating said first switch operating means to operate said first indication producing switch means and said transfer switch means a predetermined time interval after said first switching device output signal assumes said second signal value; said second switching circuit includes a third switching device having an input connected to said condition responsive means and having an output for producing an output signal of a first signal value when said electrical property is less extreme than said second predetermined value and for producing an output signal of a second signal value when said electrical property is more extreme than said second predetermined value, and a fourth switching device responsive to said second signal value output signal of said third switching device and having an output for producing an output signal to return the output signal of said first switching device to said first signal value when said electrical property moves from said first predetermined value to said second predetermined value in less than said predetermined time interval and to actuate said second switch operating means when said electrical property moves from said first to said second predetermined value in greater than said predetermined time interval.

3. Apparatus according to claim 2, wherein said transfer switch means normally connects the output of said fourth switching device to the output of said first switching device and connects the output of said fourth switching device to said second switch operating means when said first switch operating means is actuated.

4. Apparatus according to claim 3, wherein said first and second switch operating means are first and second relay coils, said first indication producing switch means and said transfer switch means are sets of switch contacts under the control of said first relay coil, and said second indication producing switch means is a set of switch contacts under the control of said second relay coil.

References Cited in the file of this patent

FOREIGN PATENTS 1,217,202    France _____ Dec. 7, 1959